(12) United States Patent
Campbell et al.

(10) Patent No.: US 10,962,055 B2
(45) Date of Patent: Mar. 30, 2021

(54) ALUMINIUM ALLOY COMPOSITION FOR A SLIDING ELEMENT

(71) Applicants: MAHLE International GmbH, Stuttgart (DE); Mahle Engine Systems UK Limited, Rugby (GB)

(72) Inventors: Sylvia Campbell, Lanarkshire (GB); Jeff Carter, Warwickshire (GB); Falko Langbein, Warwickshire (GB); James Stewart, North Ayrshire (GB)

(73) Assignee: Mahle International GmbH

( * ) Notice: Subject to any disclaimer, the term of this patent is extended or adjusted under 35 U.S.C. 154(b) by 315 days.

(21) Appl. No.: 15/680,829

(22) Filed: Aug. 18, 2017

(65) Prior Publication Data
US 2018/0051748 A1    Feb. 22, 2018

(30) Foreign Application Priority Data

Aug. 19, 2016 (GB) ...................... 1614200

(51) Int. Cl.
*F16C 33/12* (2006.01)
*C22C 21/00* (2006.01)
(Continued)

(52) U.S. Cl.
CPC .......... *F16C 33/121* (2013.01); *B32B 15/012* (2013.01); *B32B 15/016* (2013.01);
(Continued)

(58) Field of Classification Search
None
See application file for complete search history.

(56) References Cited

U.S. PATENT DOCUMENTS

| 4,806,308 | A | | 2/1989 | Kamiya et al. |
| 6,163,961 | A | * | 12/2000 | McMeekin ............ F16C 33/14 29/898.056 |

(Continued)

FOREIGN PATENT DOCUMENTS

| EP | 1108797 A2 | 6/2001 |
| EP | 2845917 A3 | 12/2015 |

(Continued)

OTHER PUBLICATIONS

English abstract for JP-H11209836.
(Continued)

*Primary Examiner* — Daniel J. Schleis
(74) *Attorney, Agent, or Firm* — Fishman Stewart PLLC

(57) ABSTRACT

An Aluminium alloy composition for a sliding element may include: 4 wt % to 8 wt % of Tin; 4 wt % to 8 wt % of Silicon; 0.4 wt % to 1.7 wt % of Copper; and 0.1 wt % to 1 wt % of Manganese. The composition may also include at least one of: 0.4 wt % to 2.0 wt % of Nickel; 0.01 wt % to 0.3 wt % of Zirconium; 0.05 wt % to 0.3 wt % of Vanadium; 0.05 wt % to 0.5 wt % of Scandium; and 0.05 wt % to 1 wt % of Erbium. The composition may also include at least one of: 0.005 wt % to 0.2 wt % of Titanium; 0.003 wt % to 0.2 wt % of Strontium; 0.005 wt % to 0.5 wt % of Antimony; 0.005 wt % to 0.1 wt % of Europium; and 0.001 wt % to 0.02 wt % of Carbon. The balance of the composition, apart from any incidental impurities, may be Aluminium.

20 Claims, 1 Drawing Sheet

(51) Int. Cl.
  *B32B 15/01* (2006.01)
  *B32B 15/20* (2006.01)
  *C22C 21/02* (2006.01)

(52) U.S. Cl.
  CPC .............. *B32B 15/20* (2013.01); *C22C 21/00* (2013.01); *C22C 21/003* (2013.01); *C22C 21/02* (2013.01); *F16C 33/125* (2013.01); *F16C 2204/20* (2013.01); *Y10T 428/12764* (2015.01)

(56) References Cited

U.S. PATENT DOCUMENTS

2003/0012972 A1    1/2003    Hasegawa et al.
2013/0022493 A1*   1/2013    Fukuda .................. C22C 21/02
                                                        420/537

FOREIGN PATENT DOCUMENTS

| | | |
|---|---|---|
| GB | 2266564 A | 11/1993 |
| GB | 2271779 A | 4/1994 |
| GB | 2358872 A | 8/2001 |
| JP | S5693849 A | 7/1981 |
| JP | H04297539 | * 10/1992 |
| JP | H08157993 A | 6/1996 |
| JP | H1H11209836 A | 8/1999 |
| WO | WO-2014/157650 A1 | 10/2014 |

OTHER PUBLICATIONS

European Search Report dated Nov. 29, 2017.
J R Davis: "Aluminum and Aluminum Alloys", ASM International, Alloying: Understanding the Basics, Dec. 31, 2001, p. 351-416.
Chinese Office Action dated Aug. 3, 2020 for copending Chinese Application No. 201710702022.6.
Machine English translation of EP2845917A2 (equivalent to EP2845917A3).

* cited by examiner

ALUMINIUM ALLOY COMPOSITION FOR A SLIDING ELEMENT

CROSS-REFERENCE TO RELATED APPLICATIONS

This application claims priority to British Patent Application No. GB 1614200.2, filed on Aug. 19, 2016, the contents of which are incorporated herein by reference.

TECHNICAL FIELD

This invention relates to an Aluminium alloy composition for a sliding element. The Aluminium alloy composition is particularly suitable for a sliding element for use in start-stop engine applications.

This invention also relates to a sliding element and to a bi-metal bearing comprising the Aluminium alloy composition. The sliding element and the bi-metal bearing are particularly suitable for use in start-stop engine applications.

BACKGROUND

Highly rated internal combustion engines have conventionally used crankshaft bearings comprising a copper based or an Aluminium based bearing alloy bonded to a backing or substrate material, for example steel. The running surface of the bearing, i.e. that surface which faces the engine crankshaft journal surface, is commonly provided with a so-called overlay coating or sliding layer. The sliding layer may be a metal layer, comprising, for example, lead, tin, bismuth, silver, copper alloys or Aluminium alloys. Alternatively, the sliding layer material may be a non-metal, polymeric, material comprising an artificial resin base, or matrix, and an additive for enhancing the load carrying capacity and/or wear resistance of the bearing.

Fuel-saving operating schemes have become popular for automotive engines, which have tended to increase the frequency with which the engine is started. Under a "stop-start" operating regime, stopping and restarting vehicle movement also leads to the engine being stopped and restarted. Under a "hybrid" operating scheme, the engine is turned off when the vehicle can be powered by an alternative power source, commonly an electric motor. Under such operating schemes, the engine is subjected to a substantially greater number of starts than conventional engines and the crankshaft is regularly accelerated from rest before a uniform hydrodynamic film of lubricant is established on the various running surfaces, including the thrust washer running layer and the counterface. This causes metal-to-metal contact between the crankshaft journal surface and the bearing surface, i.e. the oil film at the point of contact is ruptured allowing metal to metal contact, which is known as scuffing and causes wear of the running surfaces. Resistance to wear is therefore a very important consideration in the development of bearing running layer materials.

For years, developments in bearing technology for engines have focused on the development of polymer overlays which commonly provide good resistance to wear. Whilst the technical advantages of overlay coated bearings are well documented, they have the significant disadvantage of being expensive to make due to the need for separate spraying and curing operations.

In order to bring down the cost of engines, efforts are being made to develop bearings which have good resistance to wear without the need for overlay coatings. For example, published UK patent application no. GB2271779 provides multi-layer bearings having an Al—Sn bearing alloy layer and high fatigue strength and good conformability with a mating member having a backing steel plate and an intermediate bonding layer of another Aluminium alloy. The Al—Sn alloy comprises by weight, 7 to 20% Sn balance being Al and any impurities, and has a Vickers hardness of HV 50 to 80. The Aluminium alloy intermediate bonding layer comprises by weight, at least one of the elements of up to 1.7% Mn, up to 1.2% Cu and up to 1.8% Mg, balance being Al and any impurities. The hardness ratio of the Aluminium alloy intermediate bonding layer to the Al—Sn bearing alloy is from 70% to 90%.

Published UK patent application no. GB2266564 provides a multilayer plain bearing comprising a steel backing, an Aluminium alloy intermediate bonding layer, and an Aluminium bearing alloy layer. The bearing layer comprises by weight, from 7 to 15% Sn, from 0.5 to 3% Si, the balance being Al and any incidental impurities, the hardness of the bearing layer being less than Vickers hardness HV 50. The bonding layer comprises by weight, at least one of the following elements, 0 to 1.7% Mn, 0 to 1.2% Cu and 0 to 1.8% Mg, the balance being Al and any incidental impurities. The Vickers hardness of the bonding layer is in a range of from 60% to 120% of the Vickers hardness of the bearing layer.

Published European patent application no. EP1108797 sought to address challenges in manufacturing Aluminium alloy bearings such as those provided in GB2271779 and GB2266564 by providing a bearing and a bearing alloy composition comprising in weight %: tin 5-10; copper 0.7-1.3; nickel 0.7-1.3; silicon 1.5-3.5; vanadium 0.1-0.3; manganese 0.1-0.3; balance aluminium apart from unavoidable impurities. Preferably, the Silicon content is maintained within the range from 2 to 3 wt %.

The inventors have appreciated that with increasing use of hard materials for engine components and increasing demand by engine manufacturers for bearings with good wear and fatigue resistance for use in start-stop engines, changes to the composition of Aluminium alloy is required to ensure the right balance between these performance requirements for sliding elements.

SUMMARY

The wt % content of the various elements referred to in the following description and the appended claims is the wt % content of the relevant element in the final Aluminium alloy composition as applied to a sliding element component (for example to a bearing for an engine or motor) rather than the wt % content of the initial mixture used to form the Aluminium alloy composition.

Some suitable techniques for measuring the wt % content of the various elements of the Aluminium alloy composition, where present, that are referred to in the following description comprise the following:

(i) X-Ray Fluorescence spectroscopy (XRF) for at least the following elements: Aluminium, Tin, Silicon, Copper, Nickel, Manganese, Vanadium, Scandium, Erbium, Titanium, Strontium, Antimony, Europium and Carbon; and (ii) Optical Emission Spectroscopy (OES) for at least the following elements: Zirconium. The skilled person will be aware that there will be other suitable techniques for measuring the wt % of the various elements of the final Aluminium alloy composition as applied to a sliding element component to ensure that they are present in the Aluminium alloy composition with the specified content.

The present invention seeks to provide an Aluminium alloy composition for a sliding element that provides effective resistance to wear and fatigue without the need for a polymer overlay. The present invention also seeks to provide an Aluminium alloy composition that is particularly suitable for sliding elements for use in start-stop engine applications. The present invention also seeks to provide a sliding element comprising the Aluminium alloy composition that is cheaper to make and/or easier to recycle than known sliding elements comprising polymer overlays.

The present invention is defined in the independent claims and provides, in a first aspect, an Aluminium alloy composition for a sliding element, wherein the Aluminium alloy composition comprises at least the following combination of elements:—
  Tin (Sn)—4 wt % to 8 wt %;
  Silicon (Si)—4 wt % to 8 wt %;
  Copper (Cu)—0.4 wt % to 1.7 wt %;
  Manganese (Mn)—0.1 wt % to 1 wt %; and
wherein the Aluminium alloy composition further comprises at least one of the following elements:—
  Nickel (Ni)—0.4 wt % to 2.0 wt %;
  Zirconium (Zr)—0.01 wt % to 0.3 wt %;
  Vanadium (V)—0.05 wt % to 0.3 wt %;
  Scandium (Sc)—0.05 wt % to 0.5 wt %;
  Erbium (Eb)—0.05 wt % to 1 wt %; and
wherein the Aluminium alloy composition further comprises at least one of the following elements:—
  Titanium (Ti)—0.005 wt % to 0.2 wt %;
  Strontium (Sr)—0.003 wt % to 0.2 wt %;
  Antimony (Sb)—0.005 wt % to 0.5 wt %;
  Europium (Eu)—0.005 wt % to 0.1 wt %;
  Carbon (C)—0.001 wt % to 0.02 wt %; and
wherein the Aluminium alloy composition further comprises the following elements:—
  Aluminium (Al)—balance (apart from any incidental impurities).

Preferred embodiments of the Aluminium alloy composition are particularly suitable for use in one or more of the following applications: automotive engines; transmissions; pumps; and compressor systems.

Preferred embodiments of the Aluminium alloy composition are particularly suitable for use in sliding elements intended for use in engines. For example, sliding elements comprising the Aluminium alloy composition are particularly suitable for use in the following engine components: bearing lining shells; bushes; bearing surfaces of crankshafts; bearing surfaces of camshafts; bearing surfaces of connecting rods; thrust washers; bearing surfaces of a bearing block; bearing surfaces of a bearing cap; piston assembly components such as piston rings, piston skirts, and cylinder walls and cylinder liners.

Sliding elements comprising preferred embodiments of the Aluminium alloy composition are particularly suitable for use as flanged (or flange) bearings, flanged half-bearings and flanged bushes for use in automotive applications, for example in automotive engines (e.g. for supporting crankshafts), transmissions, pumps and compressor systems. Sliding elements comprising the Aluminium alloy composition are also particularly suitable for use as bimetal bearings for engines with start-stop engine technology.

The inventors have appreciated that to make Aluminium alloy compositions more effective for use in start-stop engines, increased wear resistance is required. They have sought to achieve this by taking the counterintuitive step of increasing the Silicon content beyond that which was previously thought to be the maximum Silicon content that would provide an effective balance between wear resistance, strength and ease of manufacture. They have also appreciated that by adding additional elements to the composition within carefully selected ranges, they can compensate for the adverse effects which have been associated with an increase in the Silicon content, such as reduction in strength of the compositions and the need for additional heat treatments and/or and for a series of smaller rolling steps when manufacturing sliding elements comprising the material.

The inventors have found that the wt % content of the Silicon in the Aluminium alloy composition, rather than the size of the Silicon particles, provides the greatest benefit to the wear resistance of the composition. This represents a departure from earlier theories that the size of the Silicon particles is of greater importance and should be the main focus for development.

The inventors have found that such an Aluminium alloy composition provides increased wear resistance compared to known Aluminium alloy compositions and wear resistance that is comparable with that associated with polymer overlays. The strength of the Aluminium alloy composition is also considered to be adequate for use in the applications referred to throughout this specification.

A primary purpose of the Tin is to provide the soft phase and is particularly beneficial where the Aluminium alloy composition is used on sliding elements (e.g. bearings) which do not have any overlay coating. The Tin may provide improved embeddability, seizure resistance and conformability.

A primary purpose of the Silicon is to provide a hard particle which both improves the wear resistance of the composition and conditions a sliding or rotating element against which the Aluminium alloy composition bears during use (e.g. as a bearing running layer bearing against a shaft).

Incorporating both Tin and Silicon into the composition is believed to provide an effective balance between the performance requirements of sliding elements for start-stop engine, including wear resistance, fatigue resistance, seizure resistance, embeddability and conformability.

A primary purpose of the Copper and Nickel, where present, is to strengthen the Aluminium alloy composition. Their inclusion in the composition is important to increase the high temperature strength (e.g. during heat treatments) of the composition which has a higher than Silicon content than prior art compositions.

The inventors have further appreciated that there may be benefits associated with adding a combination of Nickel, where present, and Copper to the composition. The addition of Nickel forms Ni—Cu-Aluminide which has a higher temperature stability than $Al_2Cu$ which is commonly found in Aluminium alloy compositions. The Ni—Cu-Aluminide also exhibits no, or reduced, coarsening which is commonly associated with $Al_2Cu$ and instead stays in a fine distribution, resulting in better cold-rolling capability.

A primary purpose of the element Manganese and Zirconium, Vanadium, Scandium and Erbium, where present, is to provide secondary strengthening elements and recrystallisation inhibitors for the Aluminium. Although each of these elements behaves in a similar manner, the magnitude of their effect on the composition can vary. The inventors have further appreciated that there may be benefits associated with including more than one of these elements which may provide a more robust composition in terms of production processing and inherent variability of batch heat treatments.

A primary purpose of the elements Titanium, Strontium, Antimony, Europium and Carbon, where present, is to be a grain refiner and/or Silicon modifier.

Some preferred features of the present invention are set out in the dependent claims to which reference should now be made.

A preferred Aluminium alloy composition according to preferred embodiments of the present invention comprises the following combination of elements:—
- Tin (Sn)—4 wt % to 8 wt %;
- Silicon (Si)—4 wt % to 8 wt %;
- Copper (Cu)—0.4 wt % to 1.7 wt %;
- Manganese (Mn)—0.1 wt % to 1 wt %;
- Nickel (Ni)—0.4 wt % to 2.0 wt %;
- Vanadium (V)—0.05 wt % to 0.3 wt %;
- Titanium (Ti)—0.01 wt % to 0.2 wt %;
- Strontium (Sr)—0.003 wt % to 0.2 wt %; and
- Aluminium (Al)—balance (apart from any incidental impurities).

A further preferred Aluminium alloy composition according to preferred embodiments of the present invention comprises the following combination of elements:—
- Tin (Sn)—4 wt % to 8 wt %;
- Silicon (Si)—4 wt % to 8 wt %;
- Copper (Cu)—0.4 wt % to 1.7 wt %;
- Manganese (Mn)—0.1 wt % to 1 wt %;
- Nickel (Ni)—0.4 wt % to 2.0 wt %;
- Zirconium (Zr)—0.05 wt % to 0.3 wt %;
- Vanadium (V)—0.05 wt % to 0.3 wt %;
- Titanium (Ti)—0.005 wt % to 0.2 wt %;
- Strontium (Sr)—0.003 wt % to 0.2 wt %; and
- Aluminium (Al)—balance (apart from any incidental impurities).

Preferably, the Aluminium alloy composition comprises a Silicon content of about 4 wt % to about 7 wt %, or more preferably about 5 wt % to about 7 wt %. Preferably, the Aluminium alloy composition comprises a Silicon content of about 5 wt % to about 6 wt % or about 6 wt % to about 7 wt % or about 5.5 wt % to about 6.5 wt %. In a particularly preferred embodiment, the Aluminium alloy composition comprises a Silicon content of about 6%. According to published UK patent application no. GB2271779, when the Silicon content exceeds 3.5% then the Silicon network tends to be coarser and the incidence of cracking during alloy processing, by rolling for example, increases significantly necessitating additional in process heat treatments and smaller rolling reductions per pass thus, increasing the cost of production. However, the inventors have appreciated that a higher Silicon content is preferable in order to increase the wear resistance and that other elements may be added to the composition in defined quantities to compensate for cracking during processing of the alloy.

Preferably, the Aluminium alloy composition comprises a Tin content of about 4 wt % to about 8 wt %, or more preferably about 5 wt % to about 7 wt %, or more preferably about 5.5 wt % to about 7 wt %.

Preferably, the Aluminium alloy comprises a minimum content of Copper (Cu) of about 0.7 wt % min. Preferably, the Aluminium alloy composition comprises a maximum content of Copper (Cu) of about 1.3 wt % max.

Where Nickel (Ni) is present in the composition, preferably, the Aluminium alloy comprises a minimum content of Nickel (Ni) of about 0.7 wt % min. Preferably, the Aluminium alloy composition comprises a maximum Nickel (Ni) content of about 2.0 wt % max.

Additions of either Copper or Nickel of below about 0.7 wt % may not produce the required strengthening effect whereas additions of Copper above about 1.3 wt % or Nickel above about 2.0 wt % may render the alloy difficult to process. At higher wt % contents of Copper or Nickel, only relatively small rolling reductions are possible before annealing heat treatments are required which increases the cost of the manufacturing process due to the need for multiple rolling passes.

Preferably, the Aluminium alloy comprises a minimum content of the following elements, where present: Zirconium (Zr)—about 0.05% wt % min; Vanadium (V)—about 0.13 wt % min; Scandium (Sc)—about 0.05 wt % min; Erbium (Eb)—about 0.05 wt % min; Titanium (Ti)—about 0.01 wt % min; Strontium (Sr)—about 0.005 wt % min; Antimony (Sb)—about 0.005 wt % min; Europium (Eu)—about 0.005 wt % min; and Carbon (C)—about 0.001 wt % min.

Preferably the Aluminium alloy composition comprises a maximum content of the following elements, where present: Zirconium (Zr)—about 0.2% wt % max; Vanadium (V)—about 0.2 wt % max; Scandium (Sc)—about 0.2 wt % max; Erbium (Eb)—about 0.8 wt % max; Titanium (Ti)—about 0.05 wt % max; Strontium (Sr)—about 0.1 wt % max; Antimony (Sb)—about 0.4 wt % max; Europium (Eu)—about 0.05 wt % max; Carbon (C)—about 0.01 wt % max.

The inventors have further appreciated that there are benefits associated with increasing the Manganese (Mn) content of the Aluminium alloy composition compared to prior art compositions and have extended the range of Manganese content from about 0.1 wt % up to about 1.0 wt %, preferably about 0.2 wt % to about 0.8 wt %, more preferably about 0.2 wt % to about 0.5 wt % or about 0.2 wt % to about 0.4 wt % or about 0.2 wt % to about 0.3 wt %. Manganese is a grain refining agent producing smaller Aluminium grains and thereby strengthens by solid solution hardening the resulting Aluminium alloy compared to when it is not present in the alloy. At concentrations of below about 0.2 wt %, the grain refining effect may be too small. At concentrations of above about 0.8 wt %, the alloy processing may become difficult and expensive necessitating multiple heat treatment and rolling steps.

The inventors have further appreciated that there may be benefits associated with the addition of Manganese in the Aluminium alloy composition in correcting the shape of acicular or of plate-like Iron constituents and thereby decreasing their embrittling effect.

This may enable the Iron content of the composition to be increased, thereby reducing the cost of the Aluminium alloy composition and enhancing its capability to be recycled.

The inventors have further appreciated that there may be benefits associated with including a combination of both Manganese and Iron in the Aluminium alloy composition with an combined content of between about 0.1 wt % min and about 2.0 wt % max.

The inventors have further appreciated that there may be benefits associated with including Zirconium (Zr) in the Aluminium alloy composition and have included it in the range about 0.01 wt % to about 0.3 wt %, more preferably about 0.02 wt % to about 0.2 wt %, more preferably about 0.05 wt % to about 0.2 wt %. Zirconium is an effective element-anti-re-crystallizer in Aluminium alloys (and also a strong refiner for cast grain structure). It increases the recrystallisation temperature of the Aluminium and changes the point at which the Aluminium grains change during the heat treatment process and thereby improves the strength of the resulting Aluminium alloy compared to when it is not present. The addition of Zirconium, even in small quantities, has been found to cause a significant increase in the strength of an Aluminium alloy composition with an increased Silicon content. The inventors have further appreciated that there may be benefits associated with the addition of Zirconium to an Aluminium alloy composition comprising Silicon, Tin and Copper, as, unlike some other elements, the Zirconium may enhance the strength of the alloy without reacting with the Silicon or Tin or Copper.

Iron is often present in Aluminium alloy compositions due to technical impurities. Chromium has also been used in prior art Aluminium alloy compositions. The inventors have appreciated that in preferred embodiments of the Aluminium alloy composition of the present invention which comprise Manganese, the Manganese and Iron will tend to form very coarse intermetallic phases with Chromium which would not be beneficial for the performance of the composition. The inventors have found that Zirconium does not show this same interaction with Manganese and Iron. Zirconium is therefore a good replacement for Chromium, particularly in Aluminium alloy compositions comprising Manganese and Iron such as in preferred embodiments of the Aluminium alloy composition of the present invention, as it does not lead to very coarse intermetallic phases. As such, an Aluminium alloy composition comprising a combination of Manganese and Zirconium is more suitable for use in applications requiring a balance between a number of operating characteristics such as in sliding elements (e.g. bimetal plain bearings) for start-stop engine applications.

Elements such as Vanadium, Chromium, Zirconium, Scandium, Erbium and Cobalt react very similarly with Aluminium. If treated correctly they can inhibit Aluminium grain growth during high temperature treatments to a different extent by forming fine precipitates of the type $Al_3X$. However, adding more than one of these elements to the same composition can cause reactions and phase formations to occur. For example, adding Manganese and Chromium together can result in the formation of coarse ternary phases of the type $Al_6(Mn,Cr)$. The inventors have further appreciated that adding Zirconium to the composition does not cause this interaction with Mn and Al, thereby reducing or eliminating the coarse ternary phases associated with prior art compositions comprising Chromium.

The inventors have further appreciated that there may be benefits associated with including Vanadium (V) in the Aluminium alloy composition in the range about 0.05 wt % to about 0.3 wt %, preferably about 0.13 wt % to about 0.2 wt %. Vanadium may have the effect of increasing the toughness of the Aluminium alloy and helps to compensate for the brittleness which may result from the addition of an increase in the Silicon content of the allow. However, above the maximum specified wt % there may be an embrittling effect.

The inventors have further appreciated that there may be benefits associated with including Scandium (Sc) in the Aluminium alloy composition in the range about 0.05 wt % to about 0.5 wt %, preferably about 0.05 wt % to about 0.3 wt %, more preferably about 0.05 wt % to about 0.2 wt %. Scandium acts in a similar manner to Zirconium and Manganese and may have a pronounced effect on the performance of the Aluminium alloy composition as described above in relation to these other elements.

The inventors have further appreciated that there may be benefits associated with including Scandium in combination with Zirconium in the Aluminium alloy composition. Zr can partly substitute the Sc in the $Al3(Scx,Zr1-x)$ phase. This can increase the high temperature stability and strength of the composition and reduce the manufacturing cost as a reduced amount of Sc can be included when Zirconium is also added. Preferably, the ratio of Sc to Zr is about 1 to 1. In combination with up to about 1.5 wt % Copper, the content of Sc will preferably not exceed about 0.2 wt % as otherwise a ternary phase AlScCu may be formed which may adversely affect the performance of the composition in the intended applications.

The inventors have further appreciated that there may be benefits associated with including Erbium (Er) in the Aluminium alloy composition in the range about 0.05 wt % to about 1 wt %, preferably about 0.05 wt % to about 0.8 wt %. Erbium acts in a similar manner to Zirconium and Manganese and, like Scandium, may have a pronounced effect on the performance of the Aluminium alloy composition. Beneficially, it may have a similar pronounced effect as Sc but at lower cost for the master alloy.

Preferably, a maximum content of the following elements, where present, is: Titanium (Ti)—about 0.1 wt % max; Strontium (Sr)—about 0.1 wt % max; Antimony (Sb)—about 0.4 wt % max; Europium (Eu)—about 0.05 wt % max; Carbon (C)—about 0.01 wt % max.

The inventors have further appreciated that there may be benefits associated with including Strontium in the composition in the range max 0.003 wt % to max 0.2 wt, preferably max 0.005 wt % to max 0.1 wt %. Strontium is one type of Silicon modifier which may be added to the Aluminium alloy to modify the shape of the Silicon particles from coarse flake-like particles with sharp edges to fine fibrous particles or particles having a more rounded form with fewer sharp edges. This may make the Aluminium alloy composition less sensitive to concentration of stresses and fatigue cracking than a composition not comprising a Strontium content within the indicated range.

The inventors have further appreciated that there may be benefits associated with including Titanium (Ti) in the composition in the range about 0.01 wt % to about 0.2 wt %, preferably about 0.01 wt % to about 0.1 wt %, more preferably about 0.01 wt % to about 0.05 wt %. Titanium is another type of Silicon modifier and grain refiner which may be added to the Aluminium alloy to modify the grain structure of the Silicon.

The inventors have further appreciated that there may be benefits associated with including Antimony (Sb) in the composition in the range about 0.005 wt % to about 0.5 wt %, preferably about 0.005 wt % to about 0.4 wt %. This may provide a strengthening effect and/or enhance the heat treatment/age hardening process.

The inventors have further appreciated that there may be benefits associated with including Europium (Eu) in the composition in the range about 0.005 wt % to about 0.1 wt %, preferably about 0.005 wt % to about 0.05 wt %. This may provide the same benefits as those described above in relation to Scandium.

A similar benefit may be also be obtained by including Ytterbium (Yb) in the composition in the range about 0.005 wt % to about 0.1 wt %, preferably about 0.005 wt % to about 0.05 wt %.

The inventors have further appreciated that there may be benefits associated with including Carbon in the composition as a grain refiner in the range of about 0.0005 wt % to about 0.02 wt %, preferably about 0.0007 wt % to about 0.015 wt %, more preferably about 0.001 wt % to about 0.01 wt %. This may be particularly beneficial where the alloy also comprises Titanium so that the alloy comprises AlTiC grain refiner. The benefits of AlTiC being present in the composition may be particularly apparent where the composition also comprises Zirconium.

The inventors have further appreciated that there may be benefits associated with including Boron in the composition as a grain refiner in the range about 0.001 wt % to about 0.02 wt %. This is particularly beneficial where the alloy also comprises Titanium so that the alloy comprises TiB grain refiner. However, this may only be beneficial where Zirconium is not present in the composition as the Zirconium may otherwise reduce the grain refining effect of the TiB.

The inventors have further appreciated that there may be benefits associated with including one or more other hard particles in the composition in order to enhance the wear resistance. However, this will need to be balanced against the potential for a reduction in the strength and fatigue performance. If required, suitable hard particles for enhancing the wear resistance will be readily apparent to the skilled person.

The balance of the Aluminium alloy composition is Aluminium, aside from any incidental impurities. Incidental or technical impurities may comprise, for example, an Iron (Fe) content of about 0.7 wt %. However, as described above, the inventors have appreciated that there may be benefits in increasing the Iron content of the composition up to about 1.5 wt % max. These may include reduced manufacturing costs and better recyclability compared to sliding elements comprising polymer overlays.

The present invention is defined in the appended independent claims and provides, in a second aspect, a sliding element comprising the Aluminium alloy composition described above. This provides the sliding element with the benefits of the Aluminium alloy composition referred to above. Further, the ease of manufacturing such sliding elements make them cheaper to produce than sliding elements provided with polymer overlays.

Preferably, the sliding element comprises a Steel or Bronze backing layer. This provides the overall sliding element with additional strength and rigidity.

Preferably, the sliding element comprises an Aluminium intermediate layer between the backing layer and the Aluminium alloy composition. The intermediate layer is preferable for enhancing the roll bonding process for the Aluminium alloy composition which comprises Tin and a Steel backing.

The present invention is defined in the appended independent claims and provides, in a third aspect, a bi-metal bearing comprising the Aluminium alloy composition described above. This provides the bi-metal bearing with the benefits of the Aluminium alloy composition referred to above. Further, the ease of manufacturing such bi-metal bearings makes them cheaper to produce than bearings provided with polymer overlays.

Preferably, the bi-metal bearing comprises a steel or bronze backing layer. This provides the overall bearing with additional strength and rigidity.

Preferably, the bi-metal bearing comprises an Aluminium intermediate layer between the backing layer and the Aluminium alloy composition.

Although preferred embodiments of the present invention are generally concerned with improved sliding elements and bi-metal bearings which do not have a polymer overlay coating, sliding elements and bi-metal bearings of preferred embodiments of the present invention may also comprises a polymer overlay coating.

Although the description of preferred embodiments below generally relate to bearings half shells and flanged half bearings (i.e. flanged semi-annular bearings), the present invention equally applies to bushings and flanged bearings (i.e. flanged annular bearings).

BRIEF DESCRIPTION OF THE DRAWINGS

In order that the present invention may be more fully understood, some example embodiments of the present invention will now be described by way of illustration only with reference to the accompanying drawings, in which.

DETAILED DESCRIPTION

Figure 1:
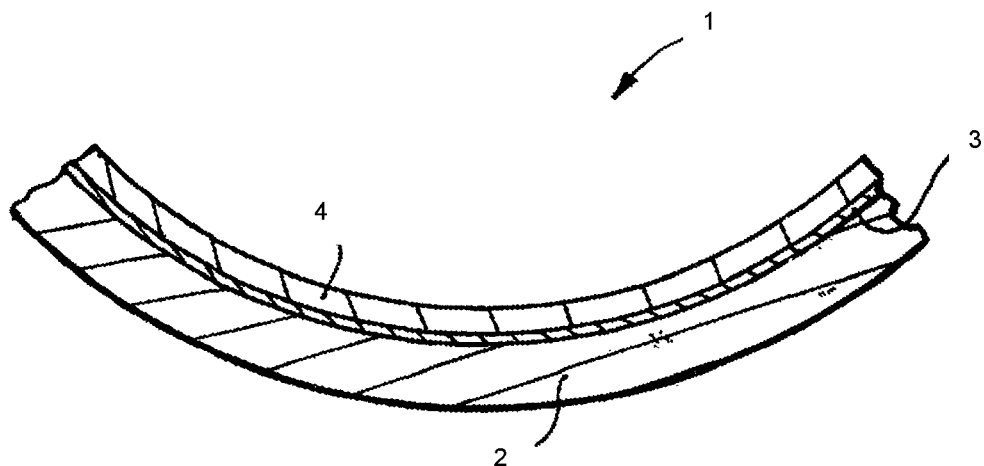
FIG. 1 shows a cross section through part of a bi-metal bearing utilising the Aluminium alloy composition of the present invention and showing the constituent layers.

FIG. 1 shows a sliding element, specifically a bi-metal plain bearing 1 comprising: a backing 2, an interlayer or intermediate layer 3 and an Aluminium alloy running layer 4.

The backing is made from steel and may optionally comprise up to about 1 wt % copper. The interlayer is made from pure Aluminium (apart from incidental impurities). The Aluminium alloy running layer comprises the Aluminium alloy composition of the first or the second preferred embodiment described above.

Sliding elements (e.g. bi-metal plain bearings) comprising the Aluminium alloy composition may be made using a known method comprising continuous strip casting (e.g. belt-caster, roll-caster or similar casting technology) followed by thermo-mechanical processing such as heat treatment, cold-rolling, cladding and steel cold roll-bonding or such as direct bonding onto steel by the means of hot-bonding with prior heat treatment and cold-rolling operations.

For example, sheet material which may, for example, be about 16 mm thick, may be heat treated by annealing and then rolled down to, for example, about 0.5 mm thick. If necessary, the rolling step may be carried out in a number of passes to reduce the thickness more gradually. However, ideally the number of passes will be minimised so as to keep the manufacturing cost to a minimum. The addition of copper into the Aluminium alloy composition increases the strength of the composition compared to a composition in which the copper is not present and helps to reduce the number of passes required.

The wt % content of the various elements referred to in the following examples is the wt % content of the relevant element in the final Aluminium alloy composition as applied to a sliding element component (for example to a bearing for an engine or motor) rather than the wt % content of the initial mixture used to form the Aluminium alloy composition.

An Aluminium alloy composition according to a first preferred embodiment of the invention that is particularly suitable for use in start-stop bearing applications comprises the following preferred combination of elements comprises the following preferred combination of elements:—

| Element | Weight percent of Aluminium alloy | Purpose |
| --- | --- | --- |
| Tin (Sn) | About 4 wt % to about 8 wt %, or preferably about 5 wt % to about 7 wt % | Solid lubricant |
| Silicon (Si) | About 4 wt % to about 8 wt %, or preferably about 4 wt % to about 7 wt %, or more preferably about 5 wt % to about 7 wt %, or more preferably about 6 wt % | Hard particle for increasing wear resistance of Aluminium alloy composition |
| Copper (Cu) | About 0.4 wt % to about 1.7 wt %, or preferably about 0.5 wt % to | Increase high temperature strength |

-continued

| Element | Weight percent of Aluminium alloy | Purpose |
|---|---|---|
| Manganese (Mn) | about 1.5 wt % About 0.1 wt % to about 1 wt % or preferably about 0.3 wt % to about 0.9 wt %, or preferably about 0.2 wt % to about 0.8 wt % | of the Aluminium alloy Secondary strengthening elements/ re-crystallisation inhibitor for the Aluminium |
| Nickel (Ni) | About 0.4 wt % to about 1.7 wt %, or preferably about 0.5 wt % to about 1.5 wt %, or more preferably about 0.5 wt % to about 1.3 wt % | Increase high temperature strength of the Aluminium alloy |
| Zirconium (Zr) | About 0.01 wt % to about 0.3 wt % or preferably about 0.02 wt % to about 0.25 wt %, or preferably about 0.05 wt % to about 0.15 wt %, preferably about 0.07 wt % | Secondary strengthening elements/ re-crystallisation inhibitor for the Aluminium |
| Titanium (Ti) | About 0.01 wt % to about 0.2 wt % or preferably about 0.015 wt % to about 0.15 wt %, or more preferably about 0.02 wt % to about 0.1 wt % | Grain refiner |
| Strontium (Sr) | About 0.003 wt % to about 0.2 wt % or preferably about 0.004 wt % to about 0.15 wt %, or more preferably about 0.005 wt % to about 0.1 wt % | Silicon modifier for modifying the Silicon grain structure |
| Aluminium (Al) | Balance (apart from incidental impurities) | Bulk |

The example embodiment of the Aluminium alloy composition in the table above may comprise one or more of the other constituents describe elsewhere in this specification. For example, it may comprise a Carbon (C) content of about 0.0005 wt % to about 0.02 wt %, preferably about 0.0007 wt % to about 0.015 wt %, more preferably about 0.001 wt % to about 0.01 wt % which acts as a grain refiner. The balance (accounting for any other optional constituents) is Aluminium.

An Aluminium alloy composition according to a second preferred embodiment of the invention that is particularly suitable for use in start stop bearing applications comprises the following preferred combination of elements:—

| Element | Weight percent of Aluminium alloy | Purpose |
|---|---|---|
| Tin (Sn) | About 4 wt % to about 8 wt %, or preferably about 5 wt % to about 7 wt % | Solid lubricant |
| Silicon (Si) | About 4 wt % to about 8 wt %, or preferably about 4 wt % to about 7 wt %, or more preferably about 5 wt % to about 7 wt %, or more preferably about 6 wt % | Hard particle for increasing wear resistance of Aluminium alloy composition |
| Copper (Cu) | About 0.4 wt % to about 1.7 wt %, or preferably about 0.5 wt % to about 1.5 wt % | Increase high temperature strength of the Aluminium alloy |
| Manganese (Mn) | About 0.1 wt % to about 1 wt % or preferably about 0.3 wt % to about 0.9 wt %, or preferably about | Secondary strengthening elements/ re-crystallisation |

-continued

| Element | Weight percent of Aluminium alloy | Purpose |
|---|---|---|
|  | 0.2 wt % to about 0.8 wt % | inhibitor for the Aluminium |
| Nickel (Ni) | About 0.4 wt % to about 1.7 wt %, or preferably about 0.5 wt % to about 1.5 wt %, or more preferably about 0.5 wt % to about 1.3 wt % | Increase high temperature strength of the Aluminium alloy |
| Zirconium (Zr) | About 0.01 wt % to about 0.3 wt % or preferably about 0.02 wt % to about 0.25 wt %, or preferably about 0.05 wt % to about 0.15 wt %, preferably about 0.07 wt % | Secondary strengthening elements/ re-crystallisation inhibitor for the Aluminium |
| Vanadium (V) | About 0.05 wt % to about 0.3 wt % or preferably about 0.1 wt % to about 0.25 wt %, or more preferably about 0.1 wt % to about 0.2 wt % | Secondary strengthening elements/ re-crystallisation inhibitor for the Aluminium |
| Titanium (Ti) | About 0.01 wt % to about 0.2 wt % or preferably about 0.01 wt % to about 0.15 wt %, or more preferably about 0.01 wt % to about 0.1 wt % | Grain refiner |
| Strontium (Sr) | About 0.003 wt % to about 0.2 wt % or preferably about 0.004 wt % to about 0.15 wt %, or more preferably about 0.005 wt % to about 0.1 wt % | Silicon modifier for modifying the Silicon grain structure |

The example embodiment of the Aluminium alloy composition in the table above may comprise one or more of the other constituents describe elsewhere in this specification. For example, it may comprise a Carbon (C) content of about 0.0005 wt % to about 0.02 wt %, preferably about 0.0007 wt % to about 0.015 wt %, more preferably about 0.001 wt % to about 0.01 wt % which acts as a grain refiner. The balance (accounting for any other optional constituents) is Aluminium.

The following table provides some further variant of the Aluminium alloy composition according to further preferred embodiments of the present invention:—

| Variant | Sn (wt %) | Si (wt %) | Cu (wt %) | Mn (wt %) | Ni (wt %) | Zr (wt %) | V (wt %) | Ti (wt %) | Sr (wt %) |
|---|---|---|---|---|---|---|---|---|---|
| 1 | 5.5-7.0 | 5.5-6.5 | 0.7-1.3 | 0.2-0.3 | — | 0.05-0.10 | — | 0.01-0.05 | — |
| 2 | 5.5-7.0 | 5.0-7.0 | 0.7-1.3 | 0.2-0.3 | 0.7-1.3 | — | 0.13-0.19 | 0.01-0.05 | 0.01-0.05 |
| 3 | 5.5-7.0 | 5.0-7.0 | 0.7-1.3 | 0.2-0.3 | 0.7-1.3 | 0.05-0.15 | 0.13-0.19 | 0.01-0.05 | 0.01-0.05 |
| 4 | 4.0-5.5 | 5.5-6.5 | 0.7-1.3 | 0.2-0.3 | 1.0-2.0 | 0.1-0.2 | — | 0.01-0.05 | 0.01-0.05 |
| Baseline 1 | 10.0-14.0 | 3.5-5.0 | 0.7-1.3 | — | — | — | — | 0.01-0.05 | 0.01-0.05 |
| Baseline 2 | 5.5-7.0 | 1.5-3.0 | 0.7-1.3 | 0.2-0.3 | 0.7-1.3 | — | 0.13-0.19 | 0.01-0.05 | 0.01-0.05 |

Any of the variants in the table above may comprise one or more of the other constituents describe elsewhere in this specification and the balance of each of these variants (accounting for any other optional constituents) is Aluminium.

A bearing having an Aluminium composition of Baseline 1 is described in GB2144149. A bearing having an Aluminium composition of Baseline 2 is described in EP1108797.

Figure 2:
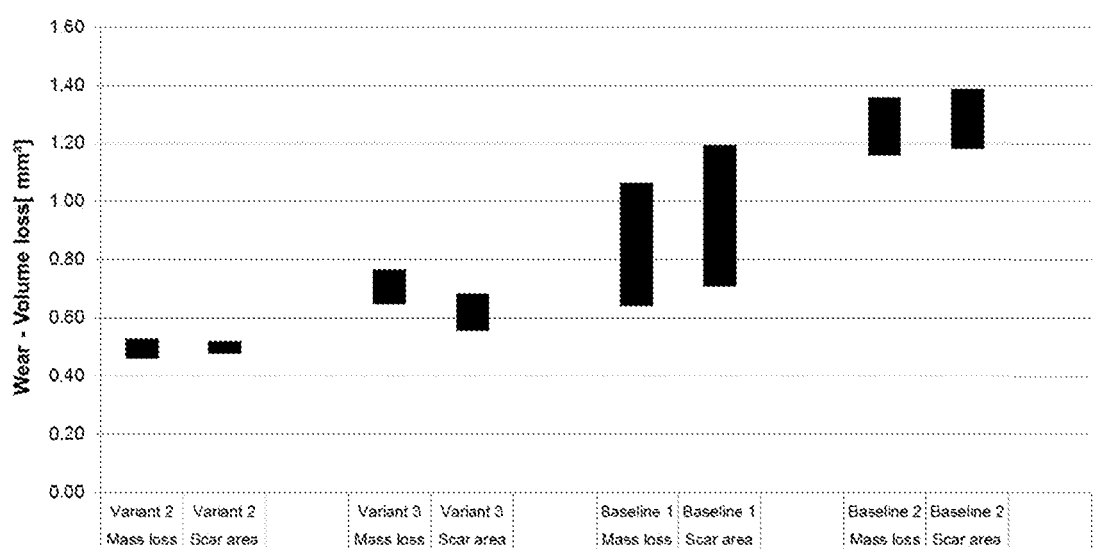
FIG. 2 provides the results of some block-on-ring wear tests using two preferred example compositions of the Aluminium alloy composition and two Baseline compositions corresponding to the composition of two of the existing bearings with an Aluminium alloy running layer.

FIG. 2 provides the results of some block-on-ring wear tests according to Active Standard ASTM G 77-05 (2010)—Standard Test Method for Ranking Resistance of Materials to Sliding Wear Using Block-on-Ring Wear Test. The test conditions include: 0W30 oil; 120° C. test temperature; 5000 cycles; 200 rpm; and 267N load. The wear loss volume was determined by weighing the parts before and after the tests and converting the mass loss with the material density into a volume loss denoted as the 'mass loss'. Furthermore, the wear loss volume was also determined by measuring the wear scar width and calculating the wear volume according to the formula provided in ASTM G77-05 (2010) denoted as the 'scar area'.

The wear results show an improvement over the known bearing elements, Baseline 1 and Baseline 2. The results show that Baseline 2, although exhibiting higher wear in the form of a greater volume loss and scar area than Baseline 1, was a further development from Baseline 1 in exhibiting greater fatigue resistance with about 55 MPa application load for Baseline 2 compared to about 45 MPa application load for Baseline 1.

As discussed above, the inventors have been seeking to provide an improved sliding element (e.g. bi-metal plain bearing) having great wear resistance for start-stop applications than the known bearing elements, Baseline 1 and Baseline 2, which operates for a extended time in mixed and boundary lubrication regimes. Until now, this has required the use of a bearing element having a polymeric overlay on top of a bimetallic bearing. However, this has kept the cost of such bearings high and the inventors have been seeking to provide a more cost effective alternative. The test results demonstrate that the Aluminium alloy composition of variants 2 and 3 exhibit improved wear resistance when compared to the Baseline variants (Baseline 1 and 2) while maintaining a high fatigue resistance of about 55 MPa application load. It can be seen from these initial test results that the Aluminium alloy composition of variant 2 exhibits higher resistance to wear than the Aluminium alloy composition of variant 3 with comparable fatigue resistance of about 55 MPa application load. This would appear to make the Aluminium alloy composition of variant 2 a good prospect for use in sliding elements for engines, particularly those operating start-stop engine regimes.

The invention claimed is:

1. An Aluminium alloy composition for a sliding element, consisting of:
   4 wt % to 8 wt % of Tin;
   4 wt % to 8 wt % of Silicon;
   0.4 wt % to 1.7 wt % of Copper;
   0.1 wt % to 1 wt % of Manganese;
   at least one of:
   0.4 wt % to 2.0 wt % of Nickel;
   0.01 wt % to 0.3 wt % of Zirconium;
   0.05 wt % to 0.3 wt % of Vanadium;
   0.05 wt % to 0.5 wt % of Scandium;
   0.05 wt % to 1 wt % of Erbium;
   at least one of:
   0.003 wt % to 0.2 wt % of Strontium;
   0.005 wt % to 0.5 wt % of Antimony;
   0.005 wt % to 0.1 wt % of Europium;
   0.001 wt % to 0.02 wt % of Carbon; and
   a balance of the composition, apart from any incidental impurities, of Aluminium.

2. The Aluminium alloy composition according to claim 1, consisting of:
   4 wt % to 8 wt % of Tin;
   4 wt % to 8 wt % of Silicon;
   0.4 wt % to 1.7 wt % of Copper;
   0.1 wt % to 1 wt % of Manganese;
   0.01 wt % to 0.1 wt % of Zirconium;
   0.4 wt % to 2.0 wt % of Nickel;
   0.05 wt % to 0.3 wt % of Vanadium;
   0.01 wt % to 0.2 wt % of Titanium;
   0.003 wt % to 0.2 wt % of Strontium; and
   the balance of the composition, apart from any incidental impurities, of Aluminium.

3. The Aluminium alloy composition according to claim 1, consisting of:
   4 wt % to 8 wt % of Tin;
   4 wt % to 8 wt % of Silicon;
   0.4 wt % to 1.7 wt % of Copper;
   0.1 wt % to 1 wt % of Manganese;
   0.4 wt % to 2.0 wt % of Nickel;
   0.05 wt % to 0.3 wt % of Zirconium;
   0.05 wt % to 0.3 wt % of Vanadium;
   0.005 wt % to 0.2 wt % of Titanium;
   0.003 wt % to 0.2 wt % of Strontium; and
   the balance of the composition, apart from any incidental impurities, of Aluminium.

4. The Aluminium alloy composition according to claim 1, wherein the Silicon content ranges from about 4 wt % to about 7 wt %.

5. The Aluminium alloy composition according to claim 1, wherein the Silicon content ranges from about 5.5 wt % to about 7 wt %.

6. The Aluminium alloy composition according to claim 1, wherein the Silicon content is about 6 wt %.

7. The Aluminium alloy composition according to claim 1, wherein the Tin content ranges from about 5 wt % to about 7 wt %.

8. The Aluminium alloy composition according to claim 1, wherein the Manganese content ranges from about 0.2 to about 0.4 wt %.

9. The Aluminium alloy composition according to claim 1, wherein the Carbon content ranges from about 0.0005 wt % to about 0.02 wt %.

10. The Aluminium alloy composition according to claim 1, wherein a minimum content of elements, where present, consists of:
    about 0.7 wt % min of Copper;
    about 0.7 wt % min of Nickel;
    about 0.05% wt % min of Zirconium;
    about 0.13 wt % min of Vanadium;
    about 0.05 wt % min of Scandium;
    about 0.05 wt % min of Erbium;
    about 0.01 wt % min of Titanium;
    about 0.01 wt % min of Strontium;
    about 0.005 wt % min of Antimony;
    about 0.005 wt % min of Europium; and
    about 0.001 wt % min of Carbon.

11. The Aluminium alloy composition according to claim 1, wherein a maximum content of elements, where present, consists of:
    about 1.3 wt % max of Copper;
    about 2.0 wt % max of Nickel;
    about 0.2 wt % max of Zirconium;
    about 0.2 wt % max of Vanadium;
    about 0.2 wt % max of Scandium;
    about 0.8 wt % max of Erbium;
    about 0.05 wt % max of Titanium;
    about 0.05 wt % max of Strontium;
    about 0.4 wt % max of Antimony;
    about 0.05 wt % max of Europium;
    about 0.01 wt % max of Carbon.

12. The Aluminium alloy composition according to claim 1, wherein the composition has 0.01 wt % to 0.07 wt % of Zirconium.

13. The Aluminium alloy composition according to claim 1, wherein the composition has 0.05 wt % to 0.5 wt % of Scandium and 0.01 wt % to 0.3 wt % of Zirconium.

14. The Aluminium alloy composition according to claim 13, wherein a ratio of Zirconium to Scandium is about one to one.

15. A sliding element comprising an Aluminium alloy composition including:
    4 wt % to 8 wt % of Tin;
    4 wt % to 8 wt % of Silicon;
    0.4 wt % to 1.7 wt % of Copper;
    0.1 wt % to 1 wt % of Manganese;
    0.01 wt % to 0.07 wt % of Zirconium;
    at least one of:
    0.4 wt % to 2.0 wt % of Nickel;
    0.05 wt % to 0.3 wt % of Vanadium;
    0.05 wt % to 0.5 wt % of Scandium;
    0.05 wt % to 1 wt % of Erbium;
    at least one of:
    0.003 wt % to 0.2 wt % of Strontium;
    0.005 wt % to 0.5 wt % of Antimony;
    0.005 wt % to 0.1 wt % of Europium;
    0.001 wt % to 0.02 wt % of Carbon; and
    a balance of the composition, apart from any incidental impurities, of Aluminium.

16. The sliding element according to claim 15, further comprising a backing layer of one of steel and bronze.

17. The sliding element according to claim 16, further comprising an Aluminium intermediate layer between the backing layer and the Aluminium alloy composition.

18. The sliding element according to claim 15, wherein a minimum content of elements, where present, includes:
    about 0.7 wt % min of Copper;
    about 0.7 wt % min of Nickel;
    about 0.05% wt % min of Zirconium;
    about 0.13 wt % min of Vanadium;
    about 0.05 wt % min of Scandium;
    about 0.05 wt % min of Erbium;
    about 0.01 wt % min of Titanium;
    about 0.01 wt % min of Strontium;
    about 0.005 wt % min of Antimony;
    about 0.005 wt % min of Europium; and
    about 0.001 wt % min of Carbon.

19. The sliding element according to claim 15, wherein a maximum content of elements, where present, includes:
    about 1.3 wt % max of Copper;
    about 2.0 wt % max of Nickel;
    about 0.2 wt % max of Zirconium;
    about 0.2 wt % max of Vanadium;
    about 0.2 wt % max of Scandium;
    about 0.8 wt % max of Erbium;
    about 0.05 wt % max of Titanium;
    about 0.05 wt % max of Strontium;
    about 0.4 wt % max of Antimony;
    about 0.05 wt % max of Europium;
    about 0.01 wt % max of Carbon.

20. A bi-metal bearing comprising an Aluminium alloy composition including:
    4 wt % to 8 wt % of Tin;
    4 wt % to 8 wt % of Silicon;
    0.4 wt % to 1.7 wt % of Copper;
    0.1 wt % to 1 wt % of Manganese;
    0.05 wt % to 0.5 wt % of Scandium;
    0.01 wt % to 0.3 wt % of Zirconium;
    at least one of:
    0.4 wt % to 2.0 wt % of Nickel;
    0.05 wt % to 0.3 wt % of Vanadium;
    0.05 wt % to 1 wt % of Erbium;
    at least one of:
    0.003 wt % to 0.2 wt % of Strontium;
    0.005 wt % to 0.5 wt % of Antimony;
    0.005 wt % to 0.1 wt % of Europium;
    0.001 wt % to 0.02 wt % of Carbon; and
    a balance of the composition, apart from any incidental impurities, of Aluminium.

\* \* \* \* \*